(12) United States Patent
Surcouf et al.

(10) Patent No.: US 10,432,987 B2
(45) Date of Patent: Oct. 1, 2019

(54) VIRTUALIZED AND AUTOMATED REAL TIME VIDEO PRODUCTION SYSTEM

(71) Applicant: Cisco Technology, Inc., San Jose, CA (US)

(72) Inventors: Andre Surcouf, St Leu la Foret (FR); Colin J. Davies, Sandleheath (GB); Guillaume S. De Saint Marc, Sevres (FR); James G. Walker, West Sussex (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/969,397

(22) Filed: May 2, 2018

(65) Prior Publication Data

US 2019/0089996 A1 Mar. 21, 2019

Related U.S. Application Data

(60) Provisional application No. 62/559,275, filed on Sep. 15, 2017.

(51) Int. Cl.
*H04N 21/234* (2011.01)
*H04N 21/854* (2011.01)
(Continued)

(52) U.S. Cl.
CPC ..... *H04N 21/23424* (2013.01); *G11B 27/034* (2013.01); *H04N 21/2187* (2013.01);
(Continued)

(58) Field of Classification Search
None
See application file for complete search history.

(56) References Cited

U.S. PATENT DOCUMENTS 6,393,196 B1 5/2002 Yamane et al.
6,435,737 B1 8/2002 Wise et al.
(Continued)

FOREIGN PATENT DOCUMENTS

EP 2530675 A2 12/2012
WO 0103008 A1 1/2001

OTHER PUBLICATIONS

Snoek et al., "A Learned Lexicon-Driven Paradigm for Interactive Video Retrieval", 2006, IEEE.
(Continued)

*Primary Examiner* — Omar S Parra
(74) *Attorney, Agent, or Firm* — Patterson + Sheridan, LLP

(57) ABSTRACT

Real-time metadata about a plurality of video streams, and information associated with a directed stream, is received. The information includes a plurality of time segments, where time segments correspond to a respective video stream selected by a director for display in the directed stream during the time segment. Additionally, it is determined, based on the information, that the directed stream will display a first video stream during a first time segment. Further, a subsidiary stream is generated for a first group of users. This involves determining to substitute a second video stream for the first video stream during the first time segment, based on real-time metadata and further based on a first set of rules associated with the first group of users. When the first time segment begins, the second video stream is outputted for display in the subsidiary stream.

20 Claims, 7 Drawing Sheets

(51) Int. Cl.
  *H04N 21/2343*  (2011.01)
  *H04N 21/2187*  (2011.01)
  *G11B 27/034*  (2006.01)
  *H04N 21/218*  (2011.01)

(52) U.S. Cl.
  CPC .  *H04N 21/21805* (2013.01); *H04N 21/23439* (2013.01); *H04N 21/854* (2013.01)

(56) References Cited

U.S. PATENT DOCUMENTS

| | | | |
|---|---|---|---|
| 6,850,252 | B1 | 2/2005 | Hoffberg |
| 2002/0170067 | A1 | 11/2002 | Norstrom et al. |
| 2003/0088872 | A1 | 5/2003 | Maissel et al. |
| 2003/0123541 | A1 | 7/2003 | Jun et al. |
| 2003/0163832 | A1 | 8/2003 | Tsuria et al. |
| 2004/0172478 | A1 | 9/2004 | Jacobs et al. |
| 2005/0097606 | A1 | 5/2005 | Scott et al. |
| 2005/0120391 | A1 | 6/2005 | Haynie et al. |
| 2005/0220439 | A1 | 10/2005 | Carton et al. |
| 2005/0251532 | A1 | 11/2005 | Radhakrishnan et al. |
| 2006/0200253 | A1 | 9/2006 | Hoffberg et al. |
| 2007/0067800 | A1 | 3/2007 | Wachtfogel et al. |
| 2007/0070069 | A1 | 3/2007 | Samarasekera et al. |
| 2007/0101266 | A1 | 5/2007 | Kim et al. |
| 2007/0153712 | A1 | 7/2007 | Fry et al. |
| 2007/0239883 | A1* | 10/2007 | Glenn ................. G11B 27/034 709/231 |
| 2007/0276926 | A1 | 11/2007 | LaJoie et al. |
| 2007/0292106 | A1 | 12/2007 | Finkelstein et al. |
| 2008/0267222 | A1 | 10/2008 | Leung et al. |
| 2008/0297588 | A1 | 12/2008 | Kurtz et al. |
| 2009/0052864 | A1 | 2/2009 | Ohde |
| 2009/0055385 | A1 | 2/2009 | Jeon et al. |
| 2009/0129678 | A1 | 5/2009 | Sukeda et al. |
| 2009/0133049 | A1 | 5/2009 | Bradley |
| 2009/0205009 | A1 | 8/2009 | Kim |
| 2009/0241142 | A1 | 9/2009 | Schuster et al. |
| 2011/0296474 | A1 | 12/2011 | Babic |
| 2012/0057852 | A1* | 3/2012 | Devleeschouwer . G11B 27/034 386/278 |
| 2012/0192217 | A1 | 7/2012 | Jeong et al. |
| 2012/0254917 | A1 | 10/2012 | Burkitt et al. |
| 2012/0271828 | A1 | 10/2012 | Raghunath |
| 2012/0307840 | A1 | 12/2012 | Ashley et al. |
| 2013/0088616 | A1 | 4/2013 | Ingrassia, Jr. |
| 2013/0191745 | A1 | 7/2013 | Vella et al. |
| 2014/0020017 | A1 | 1/2014 | Stern et al. |
| 2014/0082645 | A1 | 3/2014 | Stern et al. |
| 2014/0153900 | A1 | 6/2014 | Tanaka |
| 2014/0233923 | A1 | 8/2014 | Bradley et al. |
| 2014/0359649 | A1 | 12/2014 | Cronk et al. |
| 2015/0193497 | A1 | 7/2015 | Tallamy et al. |
| 2016/0162808 | A1 | 6/2016 | Feng et al. |
| 2016/0234566 | A1* | 8/2016 | Suoknuuti .......... H04N 21/2665 |
| 2017/0133022 | A1 | 5/2017 | Gurijala et al. |

OTHER PUBLICATIONS

Berrani et al., "TV Broadcast Macro-Segmentation: Metadata-Based vs. Content-Based Approaches", 2007, ACM.

Naturel et al, "Fast Structuring of Large Television Streams Using Program Guides", 2007, Springer-Verlag.

Marszalek et al., "Actions in Context", 2009, IEEE, 8 pages.

Kovashka et al., "Learning a Hierarchy of Discriminative Space-Time Neighborhood Features for Human Action Recognition", 2010, IEEE.

Davis et al., "From Context to Content Leveraging Context to Infer Media Metadata", 2004, ACM.

Song et al., "Multiple Feature Hasihing for Real Time Large Scale Near-Duplicate Video Retrieval", Dec. 1, 2011, ACM.

* cited by examiner

VIRTUALIZED AND AUTOMATED REAL TIME VIDEO PRODUCTION SYSTEM

CROSS-REFERENCE TO RELATED APPLICATIONS

This application claims benefit to U.S. provisional application Ser. No. 62/559,275 filed on Sep. 15, 2017. The aforementioned related patent application is herein incorporated by reference in its entirety.

TECHNICAL FIELD

Embodiments presented in this disclosure generally relate to video production. More specifically, embodiments disclosed herein relate to a virtualized and automated video production system.

BACKGROUND

Live broadcast shows (e.g., televised sporting events) today increasingly utilize a number of differing cameras and graphics in order to provide a satisfactory experience to the end user. For example, during a sporting event, a human director can switch the output feed between an overview camera, sideline cameras, and the like in order to create interesting and engaging content. Similarly, directors can overlay graphics in various positions (e.g., scores) and adjust audio content of the stream (modifying the volume, source of the audio, or whether there is audio at all, for example).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
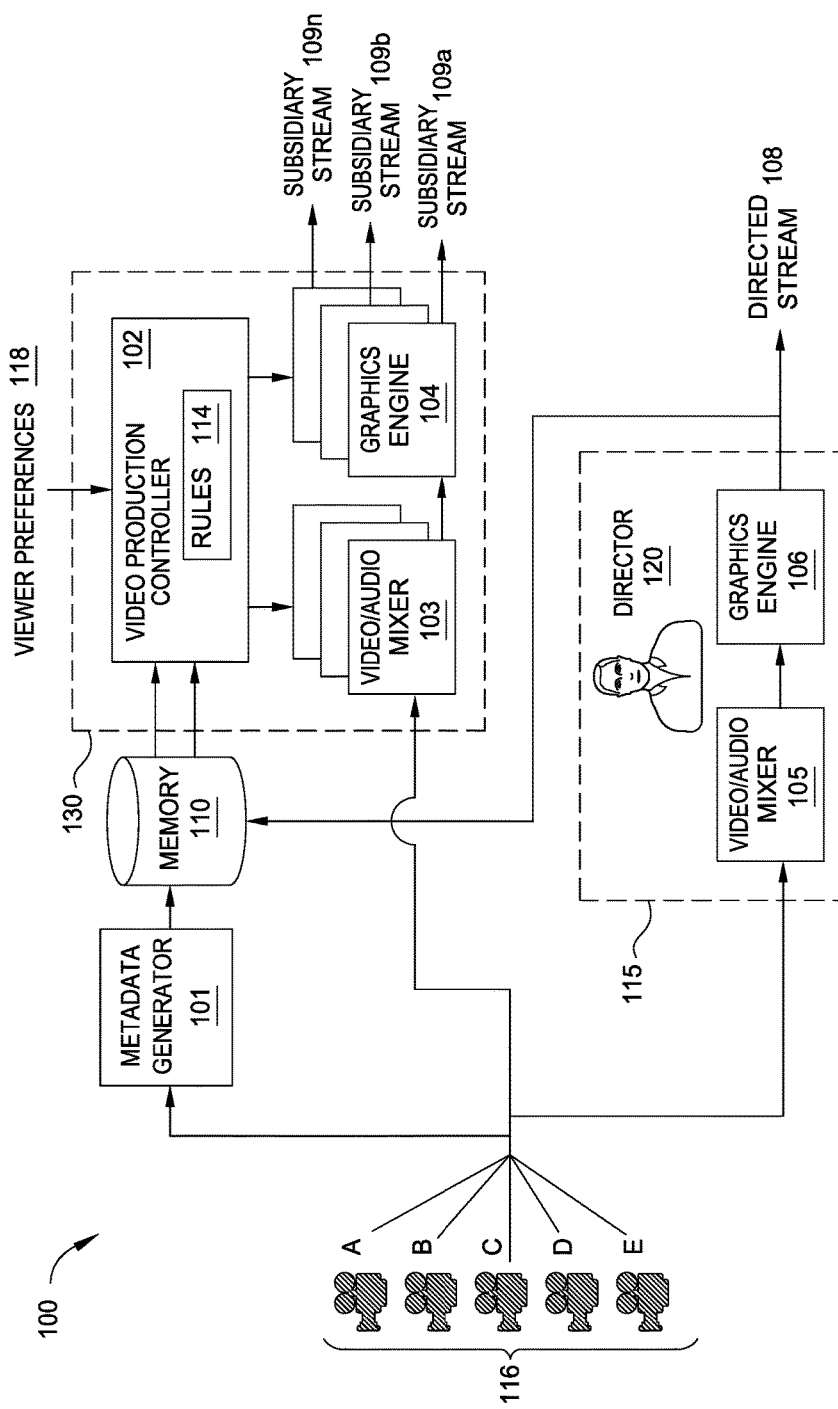
FIG. 1 illustrates an exemplary system for real-time production of video signals responsive to viewer information, according to one embodiment described herein.

One embodiment presented in this disclosure is a method. The method includes receiving real-time metadata about a plurality of video streams, and receiving information associated with a directed stream, the information comprising a plurality of time segments, wherein the time segments correspond to a plurality of video streams selected by a director for display in the directed stream during the respective time segment. The method further includes determining, based on the information, that the directed stream will display a first video stream during a first time segment. Additionally, the method includes generating a subsidiary stream for a first group of users. This involves determining to substitute a second video stream for the first video stream during the first time segment, based on real-time metadata and further based on a first set of rules associated with the first group of users, and when the first time segment begins, outputting the second video stream in the subsidiary stream.

According to a second embodiment of the present disclosure, one or more non-transitory tangible media encoding logic that includes instructions for execution that when executed by a processor, is operable to perform an operation is provided. The operation includes receiving real-time metadata about a plurality of video streams, and receiving information associated with a directed stream, the information comprising a plurality of time segments, wherein the time segments correspond to a plurality of video streams selected by a director for display in the directed stream during the respective time segment. The operation further includes determining, based on the information, that the directed stream will display a first video stream during a first time segment. Additionally, the operation includes generating a subsidiary stream for a first group of users. This involves determining to substitute a second video stream for the first video stream during the first time segment, based on real-time metadata and further based on a first set of rules associated with the first group of users, and when the first time segment begins, outputting the second video stream in the subsidiary stream.

According to a third embodiment disclosed herein, an apparatus is provided. The apparatus includes at least one processor and at least one memory element storing data, which, when executed on the processor, performs an operation. The operation includes receiving real-time metadata about a plurality of video streams, and receiving information associated with a directed stream, the information comprising a plurality of time segments, wherein the time segments correspond to a plurality of video streams selected by a director for display in the directed stream during the respective time segment. The operation further includes determining, based on the information, that the directed stream will display a first video stream during a first time segment. Additionally, the operation includes generating a subsidiary stream for a first group of users. This involves determining to substitute a second video stream for the first video stream during the first time segment, based on real-time metadata and further based on a first set of rules associated with the first group of users, and when the first time segment begins, outputting the second video stream in the subsidiary stream.

Example Embodiments

Utilizing existing directed systems, the video stream is unlikely to be optimal for some viewers because of human directorial discretion. That is, some viewers would prefer fewer camera transitions, less commentator input, more shots of a particular portion of the live event, and the like. Broadcasters have increasingly sought to create and deliver personalized video streams to their viewers as an alternative to a single main video stream (also described as a video feed or channel). One significant limitation of personalized video streams is the bandwidth required using traditional broadcast transport mediums such as satellite or cable, which may be expensive and/or complicated to provision. Another significant limitation to the creation of personalized channels is that these personalized channels or streams may require comparable equipment and production team staffing (e.g., additional technicians, directors, graphics experts, and the like). In some cases, the cost for producing these additional channels may be comparable to the cost of producing the main channel.

Increasingly, many broadcasters have attempted to deliver multiple video streams for a particular live event. Generally, a few additional channels may be broadcast alongside the main channel, and viewers may access the additional channels through a direct channel change, a mosaic-type interactive application associated with the group of channels, and so forth. To save production costs, these additional channels have minimal or no editorial input and are dedicated to a specific view of the event (e.g., an embedded camera view, a wide-angle camera view, etc.). Such an approach has had only limited success, as viewers have been required to actively, and somewhat arbitrarily, navigate between the main channel and a set of ancillary fixed-angle channel feeds without knowledge of what the other feeds contain.

According to various embodiments disclosed herein, techniques are described for a virtualized and automated real-time video production system. Such techniques are suitable for providing personalized video streams to individual viewers (or to groups of viewers) at a reduced cost. The video production system enables a large number of personalized channels to be economically produced for a given show, in line with the viewers' preferences.

In some embodiments, the video production system is configured to automatically generate, at scale and with limited incremental cost, the personalized video streams based on a master video stream controlled by a director. The video production system adapts the directed video stream using, e.g., a number of secondary video streams or sources.

FIG. 1 illustrates an exemplary system 100 for real-time production of video signals responsive to viewer information, according to one embodiment described herein. The system 100 comprises a plurality of video sources 116 configured to provide a plurality of video streams. The plurality of video sources 116 may comprise video cameras or other visual sensors having any suitable implementation. The plurality of video sources 116 may include fixed video sources and/or movable video sources. In the illustrated embodiment, five video sources 116A-E are available to provide video streams.

In some embodiments, the video sources 116 of the plurality of video sources 116 are arranged to provide a number of distinct viewpoints and/or aspects for a same physical event. Some examples of suitable physical events include sporting events, reality shows, political events, concerts, film festivals, and so forth. Additionally or alternatively, the plurality of video sources 116 may comprise computing devices that are configured to generate video signals (e.g., using graphics hardware). For example, the plurality of video sources 116 may be configured to provide different perspectives of a same virtual event, such as an online multiplayer game.

Using an example of a televised sporting event, camera A may correspond to a top view of a playing surface, camera B may correspond to a side view of the playing surface, camera C may correspond to a movable video source designated for following participants or other gameplay aspects on the playing surface. Camera D can be configured to provide zoomed and/or slow-motion video. Camera E may be configured to provide a view of a team's bench off the playing surface. Other arrangements of the plurality of video sources 116 are also possible. In some embodiments, a particular video source (e.g., a camera), may be used to provide multiple video streams simultaneously. For example, the video feed from a single camera may provide a first video stream (e.g., normal unedited footage) as well as two or more additional video streams (e.g., zoomed, cropped, in slow motion, and the like).

In the illustrated embodiment, the plurality of video streams are provided to a metadata generator 101 configured to generate real-time metadata for the video signals. In some embodiments, the metadata generator 101 is configured to automatically extract information from the various video signals, and to store the metadata to a memory or buffer (i.e., memory 110). The type of extracted information may depend on the type of event being captured by the plurality of video sources 116. Some examples of extracted information include a player/participant present in one or more frames, a number or other identifier associated with a participant, an event type (e.g., goal, fight, car crash, fire, etc.), suitable areas to composite graphics within the stream, and so forth.

In one embodiment, the metadata generator 101 analyzes the video content of the streams using one or more image processing methods to extract information from the streams. For example, facial recognition may be used to determine the individuals visible in the stream. Similarly, one or more optical character recognition (OCR) models may be used to detect text in the stream (e.g., advertisements, player numbers, etc.), which can be parsed using one or more natural language processing (NLP) models. In some embodiments, audio associated with the video stream is also processed by the metadata generator 101 in a similar manner.

In some embodiments, the metadata also includes information about the video source 116 itself (e.g., identifying the source), in addition to metadata about the content of the stream. For example, in one embodiment, the metadata associated with the streams indicates where the corresponding video source 116 is situated (e.g., high overview, on the sideline, etc.).

In some embodiments, the metadata generator 101 timestamps the extracted information to provide correct timing between the different video sources 116. The timestamp may represent an absolute time value, or may represent a frame number in a sequence. In this way, the video production controller 102 can determine what is depicted in the streams at a particular moment in time. In some embodiments, the metadata may be valid for a brief time period relative to the timestamp.

Further, although the sources shown in system 100 are video sources 116, the techniques performed by system 100 are not limited to the video sources 116. For example, the system may include audio sources, data sources (e.g., statistics), and/or metadata sources that are associated with the video source 116 or the audio sources.

The plurality of video signals are also provided to a directed feed production workflow 115, which is configured to generate a master video signal corresponding to a directed stream 108. In some embodiments, the directed stream 108 is provided to viewers using traditional broadcast transport mediums, such as satellite or cable. The directed stream 108 may additionally or alternately be provided through Internet Protocol (IP)-based streaming. The directed video signal generally includes video selected from the plurality of video signals and/or graphics and audio. The directed feed production workflow 115 generally comprises one or more computing devices and one or more human operators, such as a director 120. As shown, the directed feed production workflow 115 comprises a video/audio switch or mixer 105 and a graphics engine 106.

In the illustrated embodiment, the director 120 controls the video/audio mixer 105 to switch between the various video streams in order to create the directed stream 108. For example, the director 120 may select an overview stream, followed by a video stream containing a close-up of a player's face after they score a point. Alternatively, the director 120 may prefer to cut to the one or both team's benches to film their reactions. Of course, this decision-making depends on the preferences of the director 120, and may not be desired by some viewers. For example, some viewers may prefer to see their own team's reaction, regardless of who scored. Similarly, some viewers would prefer not to see close up video of particular players they dislike, or want reduced or no commentary from an announcer or commentator they dislike. Of course, the human director 120 is incapable of catering to these individual preferences.

In the illustrated embodiment, the director 120 also uses the graphics engine 106 to generate and overlay graphics on the directed stream 108. For example, in one embodiment, the director 120 can select which graphic(s) to overlay (e.g., statistics, the score, trivia, and the like). Similarly, the director 120 may determine where and when the graphics are to be overlaid (e.g., along the bottom of the screen, or on the left side of the screen during a time segment when nothing of interest is visible in that region). In this way, the director 120 further defines the directed stream 108.

In an embodiment, the directed stream 108 can be represented as a plurality of time segments that are associated with the particular video stream that is included in the directed stream 108 during that respective time segment. When the director 120 switches from one video source 116 to another video source 116, this defines a new time segment. Time segment boundaries may therefore be defined as a pair of time codes.

In some embodiments, when the director 120 switches from one video source 116 to another video source 116, directed stream metadata is produced and is associated with the newly created time segment. This directed stream metadata may include a timestamp, a current video source 116 and a next video source 116, a specified mode of transition between the video sources 116 (e.g., switch, fade out/in, previous and next audio source, etc.). In some embodiments, the directed stream metadata may also designate the newly created time segment as being protected. In an embodiment, if a time segment is flagged as protected, all streams (including generated subsidiary streams 109) include that protected time segment. For example, if the director 120 believes that a portion of the directed stream 108 is crucial, it can be marked as protected to ensure that all viewers receive it. Similarly, some time segments may be marked as protected automatically based on their content (e.g., commercial breaks).

In some embodiments, the directed stream includes metadata designating time segments as available for substitution. In such an embodiment, the video production controller 102 may be configured to only switch streams during such indicated time segments, and the non-flagged time segments are therefore protected.

In some embodiments, one or more of the plurality of video streams may also be designated as unavailable at defined timestamps. For example, if the camera operator has set the camera down to take a break, the associated video stream is not to be included in any of the subsidiary streams 109. In embodiments, the video source can be marked as unavailable by the operator of the source, the director 120, and the like.

In the illustrated embodiment, information associated with the directed video stream 108 is be provided to the memory 110. In some embodiments, the directed video stream itself is provided. In other embodiments, the information or metadata about the directed stream is included, without including the directed video stream itself. In some embodiments, this information comprises selection information and/or timing information. For example, the provided information may include information defining the time segments that make up the directed stream 108, as well as the selected video source during the various segments. Similarly, in embodiments, the information includes an indication of the audio source during the respective time segments, as well as any graphics that are overlaid.

In some embodiments, the real-time metadata from the metadata generator 101, the directed stream metadata, the plurality of video signals, and/or the directed video signal may be accessed by the video production controller 102 through the memory 110. In some embodiments, the memory 110 comprises a random access memory (RAM) or high-performance storage to support substantially real-time production of the video production controller 102. The memory 110 may be used to compensate for timing differences, as in some embodiments, some of the received metadata may be out of synch with the timing of the directed stream 108 (e.g., due to the time it takes to generate the metadata). As illustrated, a subsidiary feed production workflow 130 includes the video production controller 102, one or more video/audio mixers 103, and one or more graphics engines 104. In some embodiments, the metadata generator 101 and memory 110 are also included within the subsidiary feed production workflow 130.

The video production controller 102 is configured to generate a subsidiary video stream 109 using the real-time metadata about the plurality of video signals, as well as the directed stream 108 information. In some embodiments, the video production controller 102 is configured to generate a plurality of subsidiary streams 109a, 109b, . . . , 109n (generically, a subsidiary stream 109), which corresponds to a number of separate composite video signals. In some embodiments, the video production controller 102 is configured to transmit control signals to video mixer/audio 103 and/or graphics engines 104 to produce the composite video signals.

In one embodiment, the video production controller 102 is configured to generate the composite video signal based on the real-time metadata and one or more predefined rules 114 that are derived from viewer information, as will be discussed in more detail below. In some embodiments, the video signals provided by plurality of video sources 116 are uncompressed, which allows a real-time, frame-accurate switching between different feeds within the composite video signal. However, other embodiments may include video compression.

Beneficially, the plurality of subsidiary streams 109 need not be broadcasted on the same medium as the directed stream 108. In some embodiments, the video streams 109 are specific to particular viewers or groups, and may be provided through IP-based streaming, whether or not the directed stream 108 is available through IP-based streaming. Additionally, producing the video streams 109 using the video production controller 102 obviates the need for a team of skilled personnel to produce (or curate) the personalized streams.

In some embodiments, the subsidiary streams 109a, 109b, ..., 109n default to following the sequence specified by the directed stream 108, but the video production controller 102 may dynamically determine and perform opportunistic substitutions with other video sources and/or graphics feeds to personalize the subsidiary streams 109a-n, as determined via the rules 114. In some embodiments, the video production controller 102 controls a number of video/audio mixers 103 and graphics engines 104, equal to the number of subsidiary streams 109. In some embodiments, the subsidiary streams 109 are generated by corresponding video production controllers, rather than multiple subsidiary streams 109 being created by a single video production controller 102.

To produce the subsidiary streams 109, the video production controller 102 applies one or more predefined rules 114 that are derived from viewer information. The viewer information may include information corresponding to individual viewers and/or groups of individual viewers. In some embodiments, the viewer information is provided as viewer preferences 118 to the video production controller 102. The viewer preferences 118 may be indicated by the viewer using, e.g., an application running on a computing device that is communicatively coupled with the video production controller 102. For example, the viewer may explicitly provide the viewer preferences 118 by responding to prompts or otherwise specifying preferences in the application. In another example, the viewer preferences 118 may be partly or entirely inferred by the application and/or the video production controller, e.g., based on the viewer's viewing history, previous activity, associations with other viewers, and so forth.

In one embodiment, each subsidiary stream 109 corresponds to the viewer preferences 118 for a respective viewer (in a 1:1 ratio). In other embodiments, individual video streams 109 may be provided to more than one viewer. In some embodiments, groups may be defined for individual viewers having the same or similar interests, which may be reflected in the viewer preferences 118. The interests can relate to the content of the subsidiary stream 109 (e.g., supporting a particular team or person depicted in the subsidiary stream 109) and/or the presentation of the subsidiary stream 109 (e.g., preferring an embedded camera view). The groups may be defined by data that individual viewers are interested in (e.g., some viewers may prefer to view players' statistics). The groups may be defined by a set of negative rules (e.g., some viewers may not be interested in seeing what happens backstage). In some embodiments, the subsidiary streams 109 may be generated based on other characteristics, such as accessibility needs of the users. For example, a subsidiary stream 109 including graphics with large lettering and high contrast may be generated for viewers with poor eyesight, while a subsidiary stream 109 including clean commentary with reduced or no background audio may be generated for users with hearing problems.

The groups may also be defined by the application of one or more "variation factors" from the content that is included in the directed stream 108. Some non-limiting examples of the variation factors include: more team A versus team B, more or less of a particular participant, more or less of special video features (such as slow motion replay, zoom), more or less bench stories, more or less backstage stories, more or less statistics overlays, more or less social feeds overlays, more or less graphics overlays, and so forth.

As a result, a particular subsidiary stream 109 may be defined by a set of rules 114 (or attributes) that governing the way the subsidiary stream 109 will be produced from the different available video sources 116. Additionally, the graphics engines 104 may automatically generate graphics overlays within the subsidiary stream 109 showing different kind of information that depends on the rules 114. In some embodiments, the video production controller 102 may generate the graphics overlays for particular video streams 109 responsive to received data. The content and/or arrangement of the graphics overlays may be personalized.

Further, although described above in terms of visual effects provided through the graphics overlays, audio effects may also be provided using comparable techniques. The audio effects may be included in an audio stream that is provided to the viewer in conjunction with the subsidiary stream 109. Some non-limiting examples of audio effects include a "booing" effect when an opposing team scores, a "cheering" effect when a favorite race car driver passes another driver or takes the lead, and so forth.

In some embodiments, the subsidiary stream 109 that the viewer receives is automatically determined based on the particular user's preferences or demographics. For example, a user who supports Team A may receive a subsidiary stream 109 that was generated using rules 114 associated with supporters of Team A. In some embodiments, the rules 114 and/or the subsidiary streams 109 are further modified by real-time feedback received from the viewers. For example, viewers may provide an indication that they do not like a particular player. In embodiments, this indication may be direct (e.g., provided by the viewer to the video production controller 102 intentionally) or indirect (e.g., the viewer may post on social media about the player). In response, the video production controller 102 may modify or refine the rules 114 that were used to generate the subsidiary stream 109 that the user is receiving.

For example, based on determining that a particular user (or group of users) want to see less of a particular player, the rules 114 associated with that user or group can be modified to indicate that the particular player is not well-liked. These updated rules 114 can then be used to continue to generate the subsidiary stream 109, such that the disliked player is less likely to be shown (or will not be shown at all).

In some embodiments, the subsidiary streams 109 follows the directed stream 108 in the sense that in a subsidiary stream 109, switching between video sources 116 happens at the same time (i.e., corresponding to a same timecode) as in the directed stream 108. In other words, in some embodiments, a subsidiary stream 109 may be represented as a transformation function where a subsidiary stream $S_i$ is defined using the directed stream D, the plurality of video sources V, and the associated rules $R_i$:

$$S_i = f(D, V, R_i)$$

That is, in one embodiment, whenever the directed stream 108 changes to a different video source 116, the video production controller 102 may analyze the metadata of each video source 116, compare the metadata against the applicable rules 114 for the viewer or group of viewers, and select a video source 116 for the subsidiary stream 109 that best fits the preferences of the viewers. For example, suppose the director 120 transitions the directed stream 108 to a close-up of the coach's face. Suppose further that a first set of rules for a first set of users includes an indication that they do not like facial close-ups, and a second set of rules does not indicate any preference. In one embodiment, the subsidiary stream 109 generated according to the first set of rules 114 may include a different video source 116 that does not involve any close-ups, rather than following the directed stream 108. Similarly, because the second set of rules 114 does not indicate any preference with regards to the close-up, in some embodiments, any subsidiary streams 109 generated according to the second set of rules 114 may continue to follow the directed stream 108.

In some embodiments, the video production controller 102 may select a different video source 116 even if the rules 114 do not indicate any particular aversion to the upcoming time segment in the directed stream 108. That is, the video production controller 102 may select a video source 116 for the subsidiary stream 109 generated based on the set of rules 114 because the selected video source 116 includes something that the associated viewers likely want to see, in addition to or rather than because the directed stream 108 includes something they likely do not want to see.

In other embodiments, switching for the subsidiary streams 109 may occur at time points that are different from the directed stream 108. For example, in some embodiments, the video production controller 102 may be configured to switch to a different video source 116 within a predefined amount of time before or after a switch in the directed stream 108. That is, in an embodiment, rather than switching the subsidiary streams 109 at the same time as the directed stream 108, the video production controller 102 may switch slightly earlier or later than the directed stream 108 based on the rules 114, the metadata associated with the sources 116, and the like. In some embodiments, the video production controller 102 may switch the subsidiary streams 109 at any arbitrary point (i.e., without any corresponding switch in the directed stream 108).

In other embodiments, the timing information 113 associated with the directed stream 108 may include additional discrete switching points indicating when the video production controller 102 can leave or rejoin the directed stream 108 even where the directed stream 108 is not switching video sources 116 (e.g., the director 120 did nothing). In other words, the video production controller 102 may be entitled to switch between video sources 116 at any discrete switching point whether or not the switching point corresponds to a time segment boundary. In some embodiments, the video production controller 102 may be restricted from switching between video sources 116 when a particular time segment is designated as "protected". In such a case, the "protected" designation indicates to the video production controller 102 that the subsidiary stream 109 is to replicate the directed stream 108 during the time segment.

In some embodiments, the video streams 109 will be created with some delay relative to the directed stream 108. The delay may be used to facilitate processing by the video production controller 102. For example, at the time of switching (e.g., a time segment entry point), the video production controller 102 may programmatically determine whether to (1) continue to replicate the directed stream 108, (2) continue to replicate the directed stream 108 and add a graphic overlay, (3) switch to another video source 116, (4) switch to another video source 116 and add a graphic overlay, (5) switch back to the directed stream 108, (6) switch back to the directed stream 108 and add a graphic overlay, and so forth.

To make this determination, in one embodiment, the video production controller 102 uses knowledge of what the video sources 116 are displaying at the time of switching. In some embodiments, the video sources 116 are segmented with the same timing as the directed stream 108 (e.g., typically controlled by the director 120). In other words, in one embodiment, the video signals from the video sources 116 are divided into time segments reflecting the directed stream 108 time segments (same time codes).

For the individual video sources 116, the metadata generator 101 may create a set of metadata per time segment. In some cases, the time segment metadata for a particular video source 116 may repeat the metadata from the previous segment (e.g., where nothing changed). Additionally, within a particular time segment (driven by the directed stream 108) if something special happens, the metadata generator 101 may add additional metadata and mark the metadata with a special time code relative to the beginning of the time segment.

To apply the set of rules 114 that define a particular subsidiary stream 109, the video production controller 102 uses knowledge of what the different video sources 116 are producing. In an embodiment, the subsidiary streams 109 are sufficiently delayed from the directed stream 108 such that the required metadata is available for use. In one embodiment, the operation of the video production controller 102 may include, for a time segment entry point (or switching point), determining whether an alternate video source 116 presents a set of metadata for the time segment that better matches the rules 114 applicable to the subsidiary stream 109. If no, the subsidiary stream 109 remains on the same video source 116 during the time segment. If yes, the subsidiary stream 109 switches to the alternate video source 116 during the time segment.

In some embodiments, the video production controller 102 performs a comparison of the metadata against the rules 114 using a decision graph of deterministic or stochastic rules actioned for the possible segment substitutions. In other embodiments, the video production controller 102 performs a comparison of the metadata against the rules 114 using a deep learning artificial intelligence (AI) agent. For example, the AI agent may be trained using human expert information, such as a set of training examples obtained by recording the activity of the director 120 (e.g., the set of substitution decisions) when producing video streams that are comparable to the subsidiary streams 109. In another example, the AI agent may be trained using a "mechanical turk", such as a set of training examples that are acquired by crowd-sourcing and aggregating the most popular substitution decisions from a panel of users equipped with an interactive application allowing to manually substitute a given sequence by alternative video sources 116. In one embodiment of this approach this application could be made available as a companion application running on a separate computing device (e.g., a companion television application running on a tablet computing device).

In some embodiments, the resources used by the video production controller 102 (e.g., video/audio mixer 103, graphics engine 104) may be provisioned on-demand. For example, more resources may be provisioned when the video production controller 102 determines (based on the rules 114 and/or metadata) whether an additional subsidiary stream 109 is to be produced. In another example, the graphics engines 104 may be instantiated when graphics are to be used for a given subsidiary stream 109.

In some embodiments, the video production controller 102 is also configured to transmit instructions to the video sources 116. For example, in one embodiment, one or more of the video sources 116 may remotely controllable to aim differently (e.g., using pan and tilt servos or motors), or move physically (e.g., on a wheeled platform, or on a flying platform such as a drone or blimp). In one embodiment, the video production controller 102 can transmit control signals to these video sources 116 to adjust the video stream it produces. For example, if there are currently no video sources 116 capturing a particular event or region, the video production controller 102 may instruct a video source 116 to move or point to the desired area. In this way, the video production controller 102 has more control over the production, and ensures that video streams of the desired regions are available for use.

In some related embodiments, the video production controller 102 may transmit such control signals upon determining that there is not an available video source 116 that matches the rules 114 above a predefined threshold. That is, if none of the video sources 116 include content that is sufficiently close to the rules 114, the video production controller 102 may adjust one or more of the video sources 116 to ensure that better matches are available for future selections. Similarly, in a related embodiment, the control signal is transmitted to a human operator of the video source 116 who then adjusts the video stream, rather than allowing the video production controller 102 to adjust the video source 116 directly.

Figure 2:
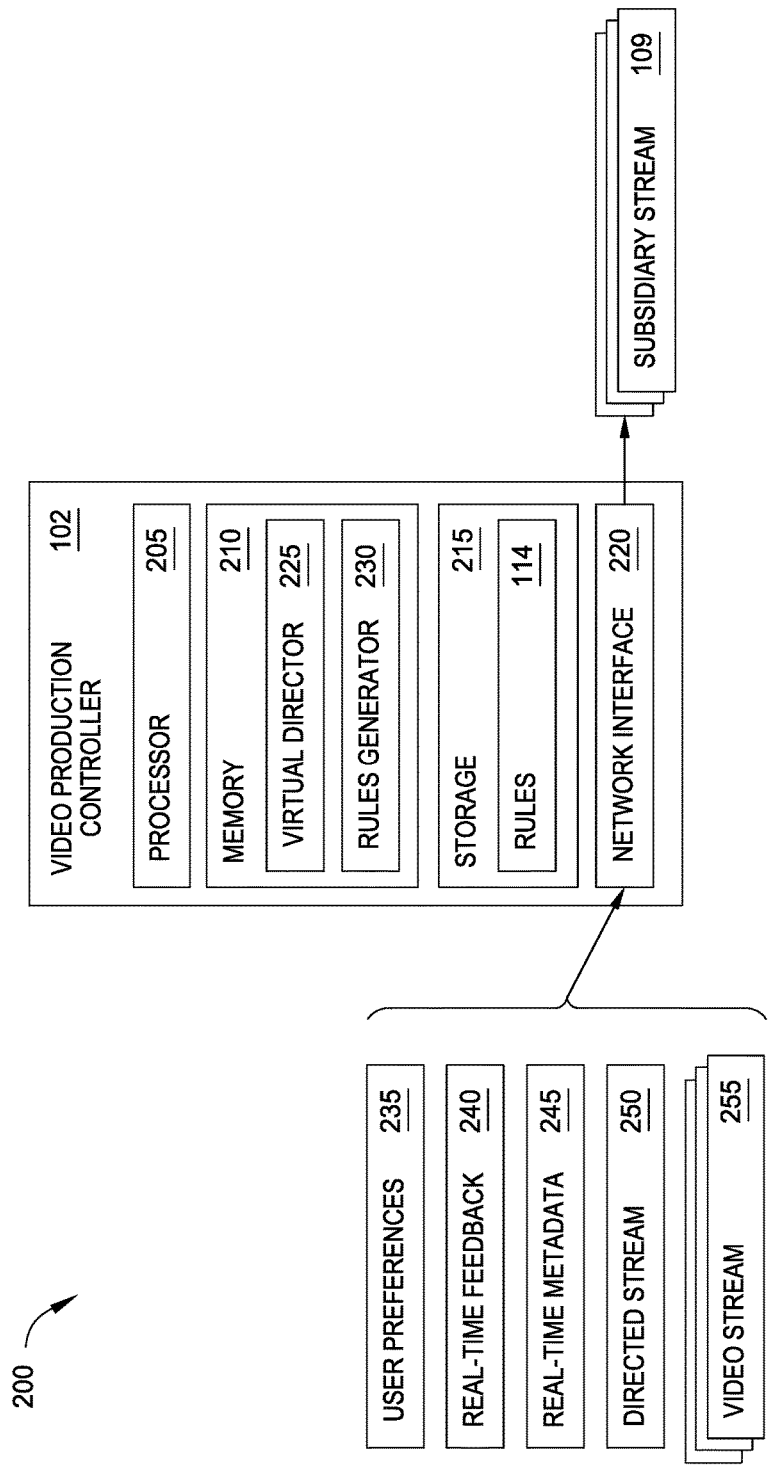
FIG. 2 is a block diagram illustrating a system for automated real-time video production, according to one embodiment disclosed herein.

FIG. 2 is a block diagram illustrating a system 200 configured for automated real-time video production, according to one embodiment disclosed herein. In the illustrated embodiment, the video production controller 102 receives user preferences 235, real-time feedback 240, real-time metadata 245, information associated with the directed stream 250, and a plurality of video streams 255. In turn, the video production controller 102 produces a plurality of subsidiary streams 109. As illustrated, the video production controller 102 includes a processor 205, memory 210, storage 215, and network interface 220. Of course, in some embodiments, the video production controller 102 operates entirely as a software module, rather than as dedicated hardware. Processor 205 may be a one or more CPUs having one or more cores. Memory 210 is generally representative of RAM. Storage 215 may include one or more hard drives, solid state drives, a storage-area network, and the like. The Network Interface 220 enables communication between the video production controller 102 and other devices over one or more networks (e.g., the Internet).

As illustrated, the memory 210 includes a virtual director 225 and a rules generator 230. Storage 215 includes rules 114. In an embodiment, virtual director 225 determines which set of rules 114 to use when generating a particular subsidiary stream 109 based on the viewer(s) who will receive the stream. For example, when a user requests a subsidiary stream 109, the virtual director 225 may determine which set of rules 114 to apply based on the user's demographics, user profile, stated preference or desire, and the like. The virtual director 225 then compares the real-time metadata 245 to this determined set of rules 114, and generates a customized subsidiary stream 109.

The rules generator 230 is generally configured to create and refine the rules 114. In the illustrated embodiment, the rules generator 230 considers user preferences 230 and real-time feedback 240. User preferences 230 generally include preferences that are directly communicated by viewers through surveys, user profiles, and the like, as well as preferences that are inferred based on viewing history and other factors. For example, in one embodiment, the user preferences 235 are captured by asking viewers to answer predefined questions. The real-time feedback 240 generally includes feedback from the viewers about the subsidiary streams 109, either provided directly to the video production controller 102 or retrieved from social media or other avenues.

In one embodiment, the rules generator 230 uses one or more clustering algorithms to cluster the user preferences 235 and/or real-time feedback 240, such that viewers with similar preferences are included within the same cluster. In some embodiments, the rules generator 230 may merge clusters that smaller than a predefined threshold (e.g., clusters that include too few viewers) with the nearest cluster, as determined by the clustering algorithm selected. In an embodiment, the rules generator 230 then generates rules that reflect the group preferences, and associates the group with the respective set of rules 114. In this way, when a user requests a subsidiary stream 109, the appropriate set of rules 114 can be retrieved. In one embodiment, the video streams 255 are associated with a corresponding camera or angle.

Figure 3:
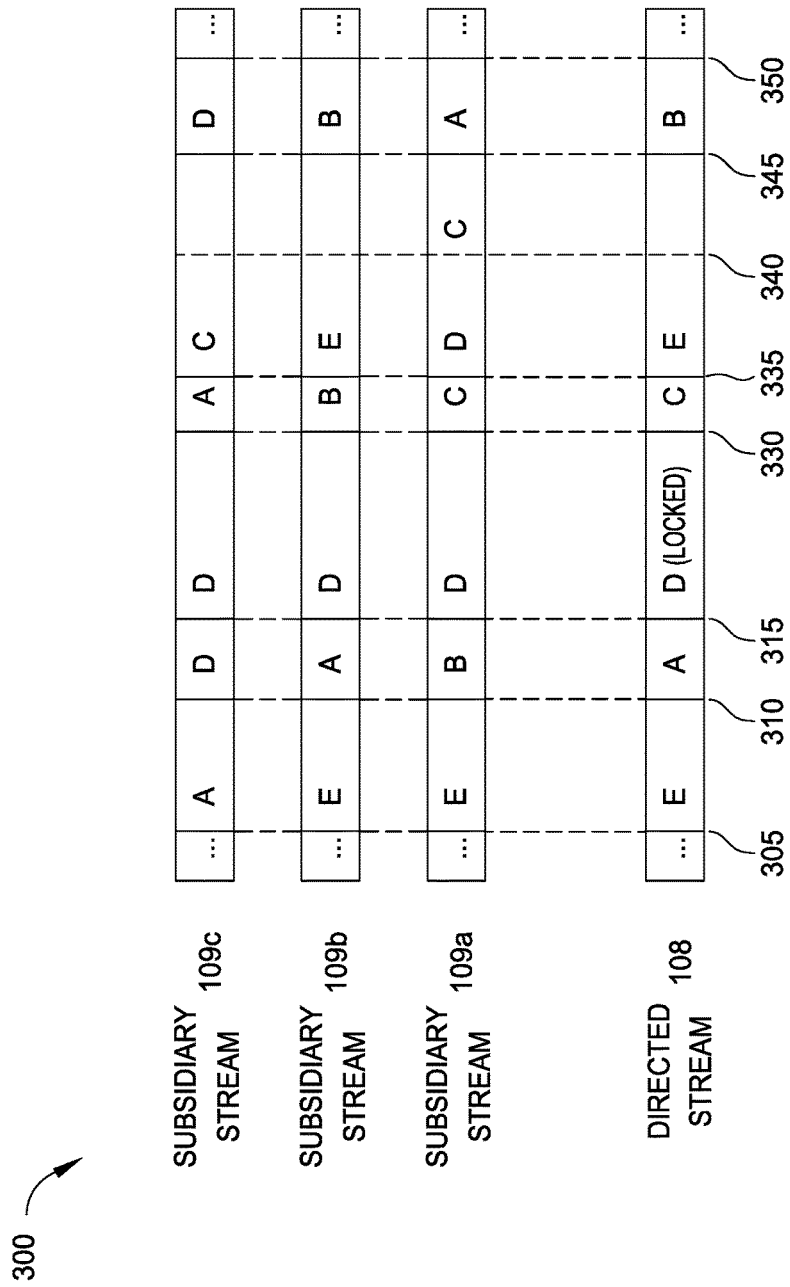
FIG. 3 illustrates a main directed stream and a plurality of automatically generated subsidiary streams, according to one embodiment described herein.

FIG. 3 illustrates a number of video streams 300, including a main directed stream 108 and a plurality of automatically generated subsidiary streams 109, according to one embodiment described herein. In the illustrated embodiment, the directed stream 108 is controlled by a human director, and includes a series of video segments selected from a plurality of video sources. For example, in the illustrated embodiment, the directed stream 108 outputs video stream E for display from time 305 to time 310. At time 310, the directed stream 108 switches to video stream A. At time 315, the director 120 switched to video stream D, and indicated that this time segment was protected (e.g., locked). At time 330, the directed stream 108 was switched to video stream C until time 335, when it switches again to video stream E. In the illustrated embodiment, the director has indicated that the subsidiary streams 109 may switch to another video stream at time 340, even though the directed stream 108 is continuing to display video stream E. At time 345, the directed stream 108 switches to video stream B.

In the illustrated embodiment, the subsidiary streams 109 are generated based on a respective set of rules 114. Because of this, the subsidiary streams 109 varies to some extent, as well as from the main directed stream 108. In the illustrated embodiment, subsidiary streams 109*a* and 109*b* replicated the directed stream 108 during the time segment between time 305 and 310. This may be, for example, because there was not another video stream that better matched the corresponding rules 114. However, subsidiary stream 109*c* includes video stream A during this same time segment. As indicated by the dashed lines, the subsidiary streams 109 can switch to a different video stream at the indicated timestamp in the directed stream 108. However, the subsidiary streams 109 need not actually switch. For example, at timestamp 315, subsidiary stream 109*c* determined that video stream D was still the best match, and so decided to continue displaying video stream D.

As illustrated, the time segment between times 315 and 330 displays video stream D, and has been flagged as locked or protected. Thus, the subsidiary streams 109*a-c* also output video stream D, regardless of how well this segment matches with the respective rules 114 used to generate the respective subsidiary stream 109. Of course, in various embodiments, the generated subsidiary streams 109 may include more or less variation from the directed stream 108, based on the rules 114 and system parameters. For example, in some embodiments, the subsidiary streams 109 includes the same video segments as the directed stream 108 unless a different video stream matches the corresponding rules 114 with a sufficiently high score. If a higher threshold is used, the resulting subsidiary streams 109 will more closely match the directed stream 108. In one embodiment, the director 120 may determine this threshold to retain more control over the subsidiary streams 109.

In some embodiments, the subsidiary streams 109a-c may be generated by selecting video segments from the video streams and creating a file containing these selected segments in the selected order. In some embodiments, generating the subsidiary stream 109a-c involves outputting (e.g., streaming) the selected video stream (e.g., via a network) to users, and switching between the streams as they are transmitted in real-time. The subsidiary stream 109 is then received by the end user and rendered for display by the end user's device.

Figure 4:
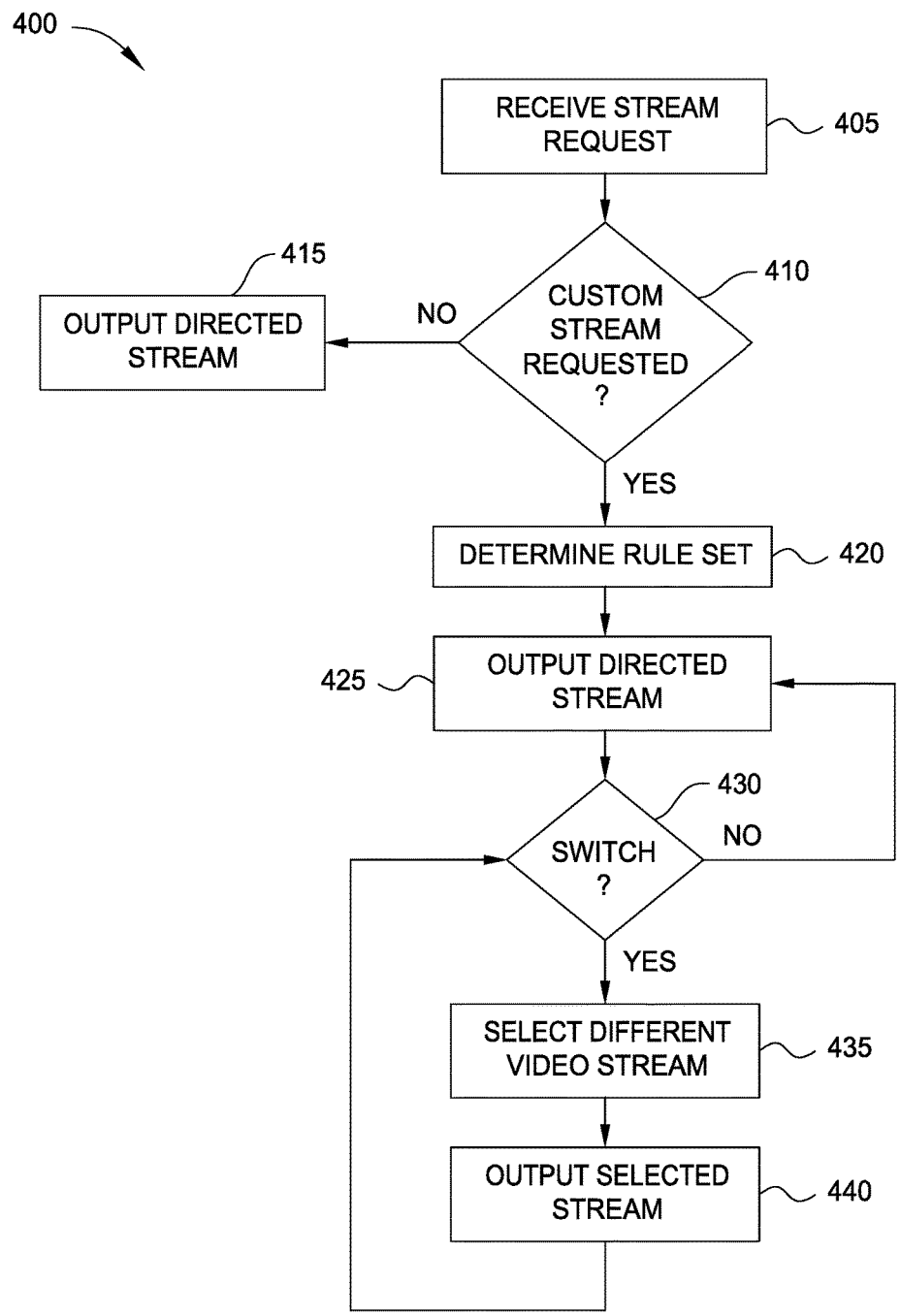
FIG. 4 is a flow chart illustrating a method of generating customized streams, according to one embodiment disclosed herein.

FIG. 4 is a flow chart illustrating a method 400 of generating customized streams, according to one embodiment disclosed herein. The method 400 begins at block 405, where the video production controller 102 receives a request for a stream. For example, a user may navigate to a webpage or click a hyperlink to view a live stream of a soccer game. At block 410, the video production controller 102 determines whether a customized stream was requested. For example, in some embodiments, the user may indicate whether they want to view the main directed stream or a customized subsidiary stream. In some embodiments, the directed stream is provided unless the user affirmatively requests a subsidiary stream. In other embodiments, a customized stream is provided unless the user requests the directed stream.

If the video production controller 102 determines that the user does not want a customized subsidiary stream, the method 400 continues to block 415, where the directed stream is provided to the user. If the user requested a custom stream, however, the method 400 proceeds to block 420, where the video production controller 102 determines the appropriate set of rules to use. In one embodiment, the video production controller 102 automatically determines a set of rules to apply based on the user preferences, e.g., as indicated in the user's history or profile. In some embodiments, the video production controller 102 may prompt the user to indicate their preferences (e.g., "Are you cheering for Team A or Team B?"), and select or generate a set of rules based on the user responses.

In some embodiments, if the user does not have any history or preferences available (e.g., because it is a new user, or a user who declined to provide such preferences), the video production controller 102 can determine a set of rules based on the users demographics. For example, the video production controller 102 may determine that the user likely supports a particular based on the location of the user, the user's age, and the like. The method 400 then continues to block 425, where the directed stream is provided to the user. That is, the video production controller 102 may provide the video source that is currently being displayed in the directed stream, until arriving at a switching point.

At block 430, the video production controller 102 determines whether to switch to a different video stream. For example, as discussed above, in some embodiments, the video production controller 102 receives information associated with the directed stream indicating timestamps where the video production controller 102 can switch to a different video stream. The video production controller 102 can then analyze the determined rule set and the metadata corresponding to the available video streams in order to determine which video stream to display. In some embodiments, the video production controller 102 generates match indices for the video streams based on the associated metadata, and selects the video stream with the highest match. In some embodiments, the video production controller 102 switches to the highest-matching video stream if the match index exceeds a predefined threshold, and either continues to display the current stream or switches back to the directed stream if the indices do not exceed the threshold.

In various embodiments, the video production controller 102 utilizes various methodologies to determine how closely matched the video stream is to the set of rules. For example, in some embodiments, the video production controller 102 processes the metadata of the streams with one or more machine learning models that have been trained using human exemplars (e.g., crowd-sourced or from a director). In other embodiments, the video production controller 102 may compare the metadata and rules using other methods (e.g., using a deterministic finite state machine). Furthermore, as discussed above, in various embodiments, the video production controller 102 similarly selects which audio stream to include, additional audio effects to output, graphics to overlay, and the like.

If, at block 430, video production controller 102 determines not to switch output feeds, the method returns to block 425 and the video production controller 102 continues to output the directed stream. If the video production controller 102 determines that another video stream is better-suited, however, the method proceeds to block 435, where the video production controller 102 selects that video stream. At block 440, the video production controller 102 provides the selected video stream as output to the user. In this way, the user receives a customized subsidiary stream. The method then returns to block 430, to determine whether/when the video stream is to be switched. As discussed above, in some embodiments, the subsidiary stream continues displays the same video stream if video production controller 102 determines not to switch (i.e., the video production controller 102 continues to output whatever video stream it was already providing). In other embodiments, however, the video production controller 102 outputs the directed video stream if none of the other video streams are better matched.

Figure 5:
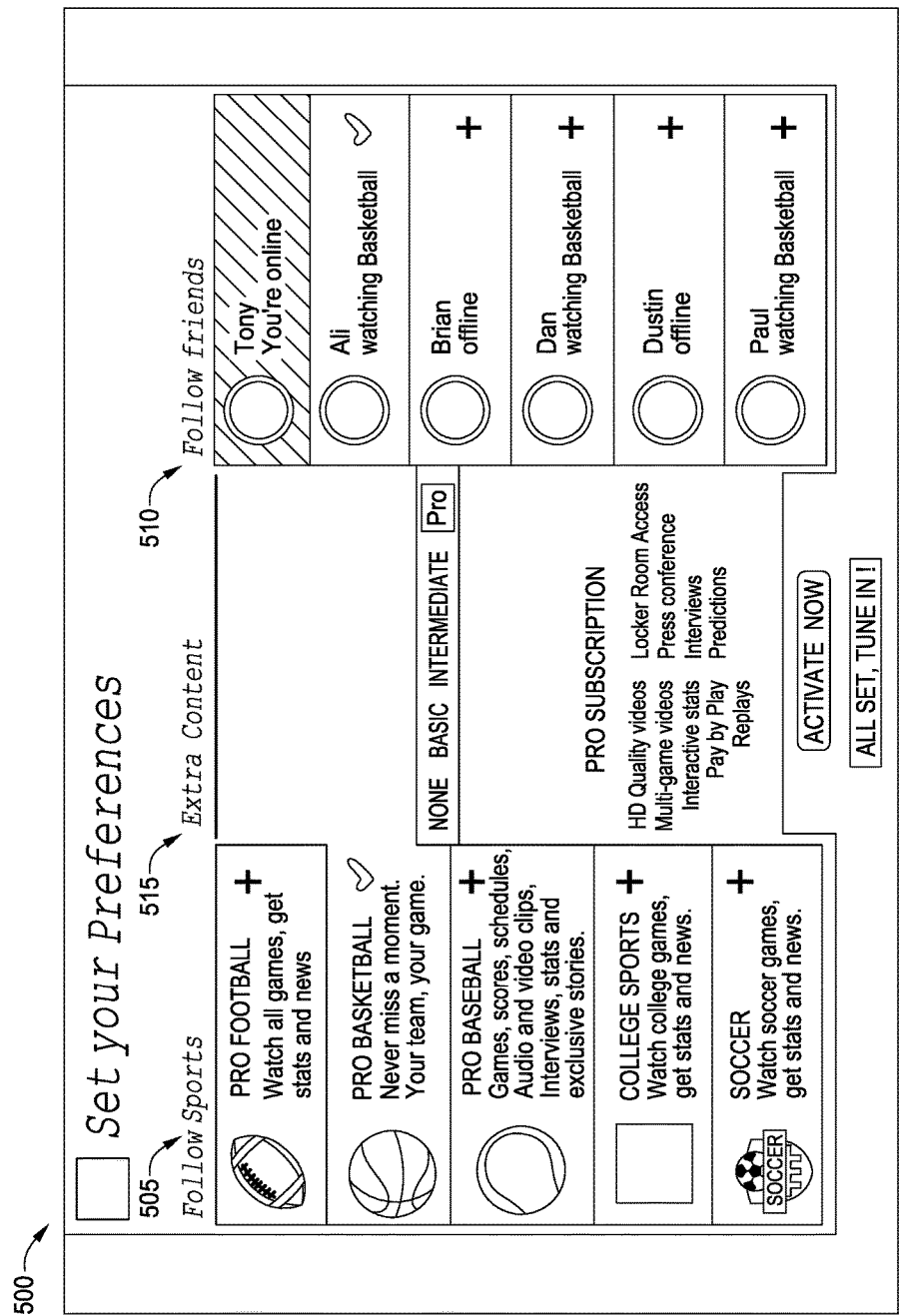
FIG. 5 is a diagram illustrating an exemplary preference selection screen, according to one embodiment described herein.

FIG. 5 is a diagram illustrating an exemplary preference selection screen 500, according to one embodiment described herein. The preference selection screen 500 may be used in conjunction with other embodiments herein. For example, the preference selection screen 500 may be produced using an application running on a computing device that is communicatively coupled with the video production controller 102. Alternatively, the preference selection screen 500 may be produced by the system using, e.g., the graphics engine 104 and transmitted as part of a subsidiary stream 109.

The preference selection screen 500 includes a first section 505 which enables the viewer to specify a preference for watching particular sports ("Follow Sports"), including professional football, professional basketball, professional baseball, college sports, soccer, and the like. The illustrated preference selection screen 500 further includes a section 510 to specify a preference for following the activities of one or more other viewers ("Follow friends"), as well as a section 515 to specify a preference for additional content ("Extra content"). In one embodiment, the viewer may first select an event to view, and next decide whether to share the experience with one or more friends.

In some embodiments, the additional content available to the viewer may be specific to the selected sport, and may include additional charges or require a subscription plan. These preferences may be used by the video production controller 102 (e.g., reflected in one or more rules 114) to provide a subsidiary stream 109 that is more personalized for the viewer. For example, as the viewer Tony is following Ali (illustrated with a checkmark), the video production controller 102 in some cases may include Tony in a same group as Ali and present them with a same or similar subsidiary stream 109. However, the groups of viewers may be based on other factors in addition to the preference for following the activities of other viewers. For example, assuming that Tony and Ali have different interests in the content or the presentation of the video stream, the video production controller 102 in some cases may include Tony and Ali in different groups, or otherwise present them with different video streams 109.

Figure 6:
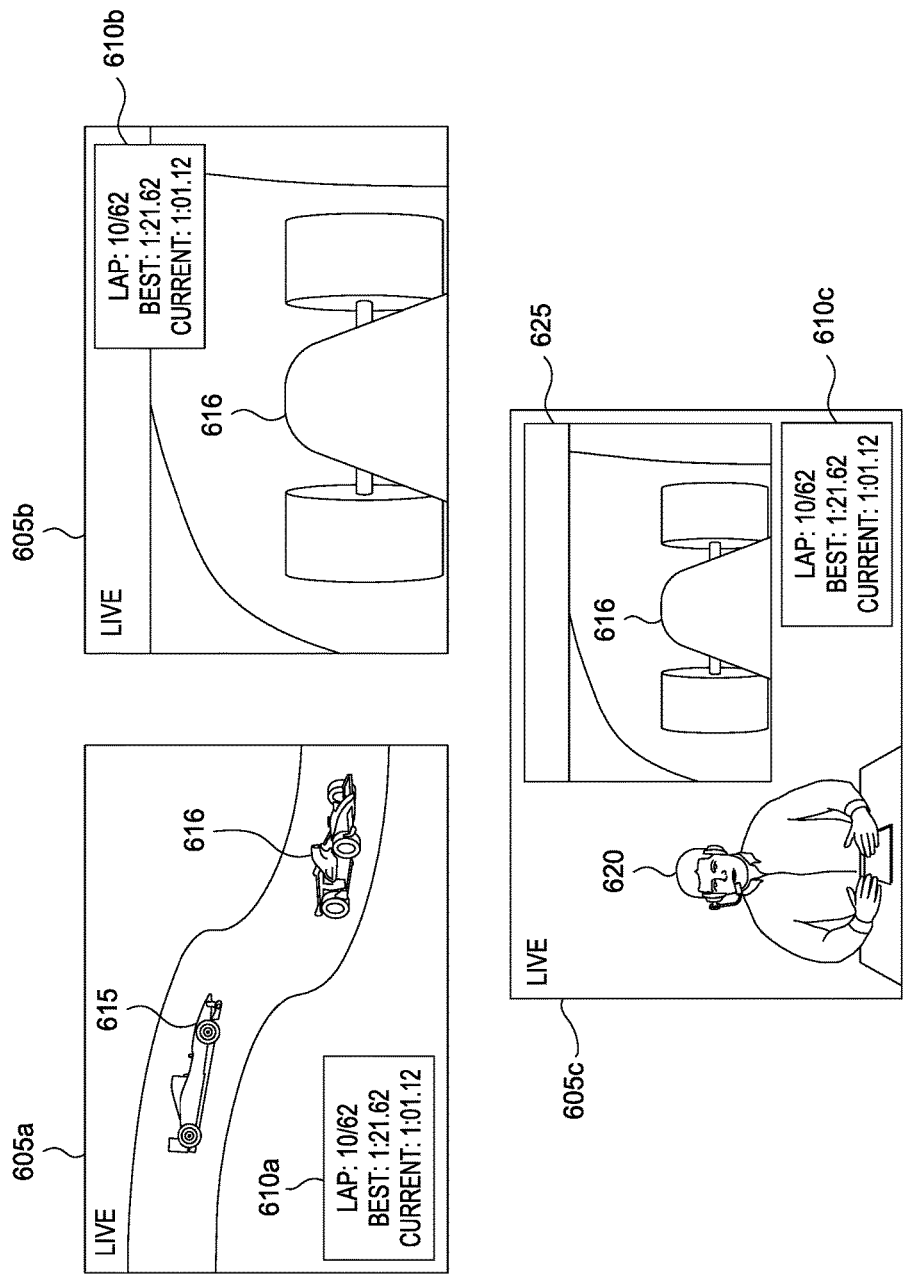
FIG. 6 illustrates a number of video streams, according to one embodiment disclosed herein.

FIG. 6 illustrates a number of video streams 605a-c, according to one embodiment disclosed herein. In the illustrated embodiment, the streams 605a-c depict to a live race. Notably, although the streams 605a-c display differing content, the streams depict the same live event (e.g., the same race) at the same time (e.g., one minute and three seconds into the tenth lap). The directed stream 605a is created according to a director's control, while the subsidiary streams 605b and 605c were generated using a different set of rules 114. For example, the subsidiary streams 605b and 605c may be generated according to different rules 114 specific to an individual, or a group of individuals clustered according to their preferences. In one example the subsidiary streams 605b and 605c may represent various subsidiary streams 109 (including graphics) transmitted by the video production controller 102. In another example, the subsidiary stream 605a-c is transmitted by the video production controller 102, and the graphical overlays are added at the computing device that receives the subsidiary stream 605b and 605c (e.g., by an application running on the computing device).

The directed stream 605a includes a graphic 610a containing statistics about the ongoing race. For example, the graphic 610a indicates that the leader is currently on lap 10 out of 62, and that their best lap time so far is 1:21.62. The graphic further indicates that the leader is one minute and three seconds into their current lap (the tenth lap of the race). As illustrated, the directed stream 605a displays an overhead view of the race, including racers 615 and 616. That is, the director 120 has selected a video stream depicting the overhead view to be included in the directed stream 605a during the current time segment.

The subsidiary streams 605b and 605c also include a graphic 610b and 610c. As illustrated, the subsidiary stream graphics 610b and 610c include the same information as the directed stream graphic 610a. Of course, in various embodiments, the graphics 610b and 610c selected for the subsidiary streams 605b and 605c could differ. For example, if the user is most interested in a particular driver, the graphic may include information about that particular driver's times, rather than the leader. Additionally, the graphics 610b and 610c may contain more or less information, be bigger or smaller, or be excluded entirely, based on the user's preferences as reflected in the corresponding rules 114.

Notably, the graphic 610b is in a different location on the video stream than he graphic 610a. That is, while the directed stream 605a includes the graphic 610a on the lower left portion of the screen, when generating the subsidiary stream 605b, the video production controller 102 placed the graphic 610b in the upper right corner. This may be, for example, because of a rule 114 indicating that informational graphics are to be placed in the upper right corner (based on user preferences), based on metadata in the video source indicating that the upper right corner is a suitable location for informational graphics, and the like. Additionally, in the subsidiary stream 605c, the graphic 610c is located on the bottom of the display.

In the illustrated embodiment, the subsidiary stream 605b and 605c are synchronized with the directed stream 605a, and depict the same moment in time during the live event. In some embodiments, the subsidiary streams 605b and 605c may be delayed somewhat relative to the directed stream 605a, for example, to ensure that the real-time metadata regarding the source video streams is available. In some embodiments, the directed stream 605a is also transmitted on a delay relative to the live event, which can, in some applications, allow the subsidiary streams 605b and 605c to remain synchronized with the directed stream 605a. For example, in some embodiments, the directed stream 605a broadcast is delayed to ensure the director 120 has sufficient time to select between the video sources, to ensure no offensive content is accidentally streamed, and the like. In such an embodiment, the selections of the director can be used by the video production controller 102 to generate the subsidiary streams 605b and 605c, to be streamed synchronized alongside the directed stream 605a once the delay elapses.

When generating the subsidiary stream 605b, the video production controller 102 selected a source video stream corresponding to an internal camera for one of the racers. Specifically, the subsidiary stream 605b displays a video stream from a camera inside of the racecar 616. The video production controller 102 may have selected this stream because, for example, the associated rules 114 correspond to a preference for internal views during the race. Similarly, the rules 114 might be associated with a group that supports the driver of the car 616. Of course, any permutation of preferences may result in rules 114 that lead to the internal stream being displayed in the subsidiary stream 605b at the current time segment, depending on the particular methodology employed by the video production controller 102.

As illustrated, the stream 605c includes a commentator 620, and also displays an internal video stream in a smaller box 625. For example, in the illustrated embodiment, the video production controller 102 selected a first source video stream that included the commentator 620, as well as a second source video stream including the internal view, to be included in a defined portion of the subsidiary stream 605c. The video production controller 102 may have selected the commentator because, for example, the rules 114 indicate that the corresponding users like to see or hear the expert commentary. Furthermore, the video production controller 102 may have included the internal stream 625 based on the rules 114 indicating that the users still want to see the action (as opposed to watching only the commentator(s)).

The subsidiary streams 605b and 605c are merely illustrative, as the subsidiary streams generated by the video production controller 102 will vary significantly depending on the corresponding rules 114. Thus, the techniques described herein support a substantial reduction of costs associated with providing personalized video streams for viewers or groups of viewers.

Figure 7:
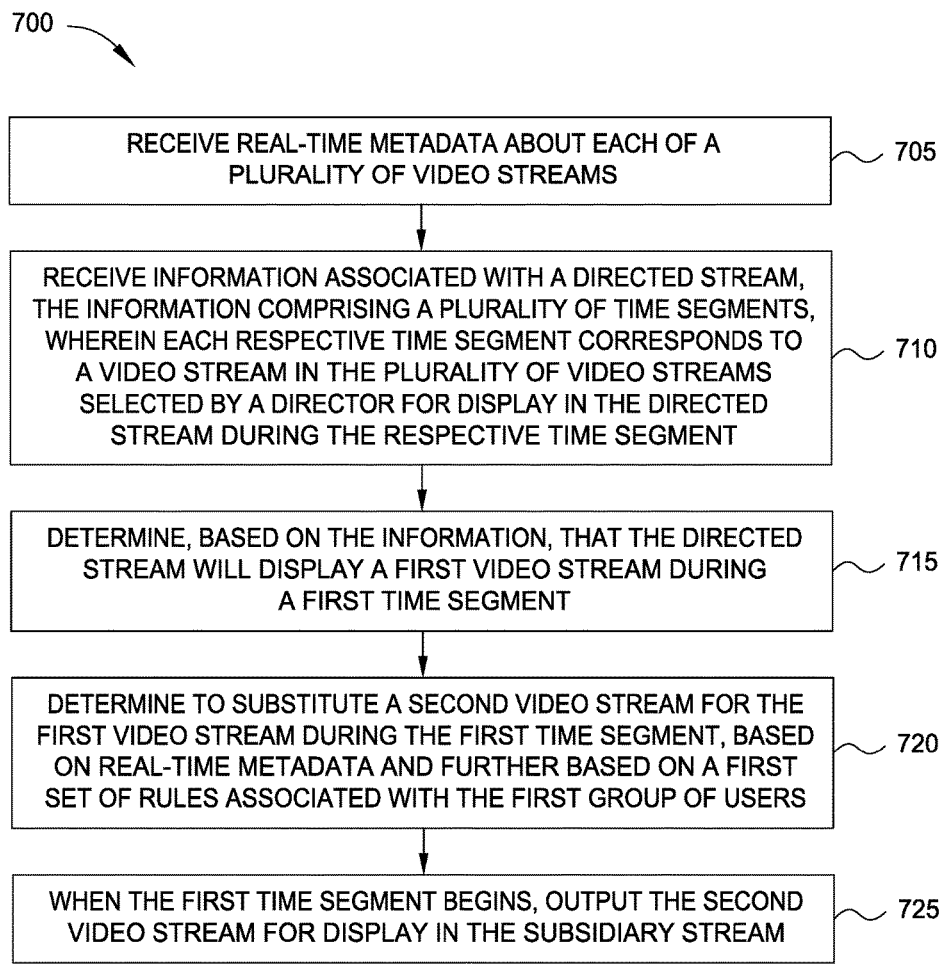
FIG. 7 is a flow diagram illustrating a method of generating customized streams, according to one embodiment disclosed herein.

FIG. 7 is a flow diagram illustrating a method 700 of generating customized streams, according to one embodiment disclosed herein. The method 700 begins at block 705, when the video production controller 102 receives real-time metadata about the plurality of video streams. Additionally, at block 710, the video production controller 102 receives information associated with a directed stream, the information comprising a plurality of time segments, wherein a respective time segment corresponds to a video stream in the plurality of video streams selected by a director for display in the directed stream during the respective time segment. At block 715, the video production controller 102 determines, based on the information, that the directed stream will display a first video stream during a first time segment. Further, the video production controller generates a subsidiary stream for a first group of users. To generate the subsidiary stream, at block 720, the video production controller 102 determines to substitute a second video stream for the first video stream during the first time segment, based on real-time metadata and further based on a first set of rules associated with the first group of users. Finally, at block 725, the video production controller 102 outputs the second video stream in the subsidiary stream when the first time segment begins.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the video production controller) or related data available in the cloud. For example, the video production controller could execute on a computing system in the cloud and generate customized subsidiary streams. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
    receiving real-time metadata about a plurality of video streams;
    receiving information associated with a directed stream, the information comprising a plurality of time segments defined by a director, wherein each respective time segment specifies a respective begin time and a respective end time, and identifies a respective video stream of the plurality of video streams, wherein the respective video stream was selected by the director for display in the directed stream during the respective time segment;
    determining, based on the information, that the directed stream will display a first video stream during a first time segment;
    generating a subsidiary stream for a first group of users by:
        generating a first score for content included in the first video stream during the first time segment, based on real-time metadata associated with the first video stream and further based on a first set of rules associated with the first group of users;
        generating a second score for content included in a second video stream during the first time segment, based on real-time metadata associated with the second video stream and further based on the first set of rules; and
        upon determining that the second score is greater than the first score, outputting the second video stream in the subsidiary stream during the first time segment.

2. The method of claim 1, the method further comprising:
    determining, based on the information, that the directed stream will display a third video stream during a second time segment;
    upon determining, based on the information, that the second time segment is locked, determining not to substitute any video stream for the third video stream during the second time segment; and
    outputting the third video stream in the subsidiary stream during the second time segment.

3. The method of claim 1, wherein the real-time metadata for the first video stream includes an indication that a predefined event occurs at a specified timestamp in the first video stream.

4. The method of claim 1, wherein the first set of rules associated with the first group of users is generated based on preferences of the first group of users.

5. The method of claim 4, the method further comprising:
    receiving real-time feedback from at least one user associated with the first group of users; and
    refining the first set of rules based on the received real-time feedback.

6. The method of claim 1, wherein generating the first score for content included in the first video stream during the first time segment comprises processing the real-time metadata associated with the first video stream using a trained machine learning model.

7. The method of claim 1, the method further comprising:
    determining, based on the real-time metadata and the first set of rules, that none of the plurality of video streams are scored above a predefined threshold during a second time segment;
    transmitting a control message to a video source that is generating a third stream of the plurality of streams, wherein the control message instructs the video source to adjust the third video stream; and
    displaying the third video stream on the subsidiary stream when the second time segment begins.

8. One or more non-transitory tangible media encoding logic that includes instructions for execution that when executed by a processor, is operable to perform an operation comprising:
    receiving real-time metadata about a plurality of video streams;
    receiving information associated with a directed stream, the information comprising a plurality of time segments defined by a director, wherein each respective time segment specifies a respective begin time and a respective end time, and identifies a respective video stream of the plurality of video streams, wherein the respective video stream was selected by the director for display in the directed stream during the respective time segment;
determining, based on the information, that the directed stream will display a first video stream during a first time segment;
generating a subsidiary stream for a first group of users by:
  generating a first score for content included in the first video stream during the first time segment, based on real-time metadata associated with the first video stream and further based on a first set of rules associated with the first group of users;
  generating a second score for content included in a second video stream during the first time segment, based on real-time metadata associated with the second video stream and further based on the first set of rules; and
  upon determining that the second score is greater than the first score, outputting the second video stream in the subsidiary stream during the first time segment.

9. The media of claim 8, the operation further comprising:
determining, based on the information, that the directed stream will display a third video stream during a second time segment;
upon determining, based on the information, that the second time segment is locked, determining not to substitute any video stream for the third video stream during the second time segment; and
outputting the third video stream in the subsidiary stream during the second time segment.

10. The media of claim 8, wherein the real-time metadata for the first video stream includes an indication that a predefined event occurs at a specified timestamp in the first video stream.

11. The media of claim 8, wherein the first set of rules associated with the first group of users is generated based on preferences of the first group of users.

12. The media of claim 11, the operation further comprising:
receiving real-time feedback from at least one user associated with the first group of users; and
refining the first set of rules based on the received real-time feedback.

13. The media of claim 8, wherein generating the first score for content included in the first video stream during the first time segment comprises processing the real-time metadata associated with the first video stream using a trained machine learning model.

14. The media of claim 8, the operation further comprising:
determining, based on the real-time metadata and the first set of rules, that none of the plurality of video streams are scored above a predefined threshold during a second time segment;
transmitting a control message to a video source that is generating a third stream of the plurality of streams, wherein the control message instructs the video source to adjust the third video stream; and
displaying the third video stream on the subsidiary stream when the second time segment begins.

15. An apparatus comprising:
at least one processor; and
at least one memory element storing data, which, when executed on the processor, performs an operation comprising:
  receiving real-time metadata about a plurality of video streams;
  receiving information associated with a directed stream, the information comprising a plurality of time segments defined by a director, wherein each respective time segment specifies a respective begin time and a respective end time, and identifies a respective video stream of the plurality of video streams selected, wherein the respective video stream was selected by the director for display in the directed stream during the respective time segment;
  determining, based on the information, that the directed stream will display a first video stream during a first time segment;
  generating a subsidiary stream for a first group of users by:
    generating a first score for content included in the first video stream during the first time segment, based on real-time metadata associated with the first video stream and further based on a first set of rules associated with the first group of users;
    generating a second score for content included in a second video stream during the first time segment, based on real-time metadata associated with the second video stream and further based on the first set of rules; and
    upon determining that the second score is greater than the first score, outputting the second video stream in the subsidiary stream during the first time segment.

16. The apparatus of claim 15, the operation further:
determining, based on the information, that the directed stream will display a third video stream during a second time segment;
upon determining, based on the information, that the second time segment is locked, determining not to substitute any video stream for the third video stream during the second time segment; and
outputting the third video stream in the subsidiary stream during the second time segment.

17. The apparatus of claim 15, wherein the real-time metadata for the first video stream includes an indication that a predefined event occurs at a specified timestamp in the first video stream.

18. The apparatus of claim 15, the operation further comprising:
receiving real-time feedback from at least one user associated with the first group of users, wherein the first set of rules associated with the first group of users is generated based on preferences of the first group of users; and
refining the first set of rules based on the received real-time feedback.

19. The apparatus of claim 15, wherein generating the first score for content included in the first video stream during the first time segment comprises processing the real-time metadata associated with the first video stream using a trained machine learning model.

20. The apparatus of claim 15, the operation further comprising:
determining, based on the real-time metadata and the first set of rules, that none of the plurality of video streams are scored above a predefined threshold during a second time segment;
transmitting a control message to a video source that is generating a third stream of the plurality of streams, wherein the control message instructs the video source to adjust the third video stream; and displaying the third video stream on the subsidiary stream when the second time segment begins.

* * * * *